US008841042B2

(12) United States Patent
Erikstrup et al.

(10) Patent No.: US 8,841,042 B2
(45) Date of Patent: Sep. 23, 2014

(54) SERIAL CONNECTED FUEL CELL STACK MODULE ASSEMBLY

(75) Inventors: Niels Erikstrup, Frederiksberg C (DK); Harald Usterud, Hørsholm (DK); Sune Danø, Bagsværd (DK)

(73) Assignee: Topsoe Fuel Cell A/S, Lyngby (DK)

( * ) Notice: Subject to any disclaimer, the term of this patent is extended or adjusted under 35 U.S.C. 154(b) by 370 days.

(21) Appl. No.: 12/778,520

(22) Filed: May 12, 2010

(65) Prior Publication Data

US 2010/0297515 A1    Nov. 25, 2010

(30) Foreign Application Priority Data

May 22, 2009    (DK) .................... 2009 00647

(51) Int. Cl.
  *H01M 8/04* (2006.01)
  *H01M 8/12* (2006.01)
  *H01M 8/24* (2006.01)

(52) U.S. Cl.
  CPC ............ *H01M 8/249* (2013.01); *H01M 8/2485* (2013.01); *H01M 2008/1293* (2013.01); *H01M 8/2425* (2013.01); *Y02E 60/50* (2013.01); *H01M 8/04089* (2013.01); *H01M 8/04014* (2013.01); *Y02E 60/525* (2013.01)
  USPC ........... 429/434; 429/444; 429/458; 429/459; 429/495

(58) Field of Classification Search
  USPC .................. 429/434, 458, 495–497, 444, 459
  See application file for complete search history.

(56) References Cited

U.S. PATENT DOCUMENTS

| | | | |
|---|---|---|---|
| 6,033,794 A | 3/2000 | George et al. | |
| 6,083,636 A | 7/2000 | Hsu | |
| 6,403,247 B1 | 6/2002 | Guthrie et al. | |
| 6,475,655 B1 * | 11/2002 | Nakanishi et al. | 429/424 |
| 2005/0112419 A1 * | 5/2005 | Zheng et al. | 429/13 |
| 2005/0112428 A1 * | 5/2005 | Freeman et al. | 429/22 |
| 2006/0172176 A1 | 8/2006 | MacBain et al. | |

FOREIGN PATENT DOCUMENTS

| | | | |
|---|---|---|---|
| JP | 2003-515910 A | 5/2003 | |
| JP | 2008-243750 A | 10/2008 | |

* cited by examiner

*Primary Examiner* — Gregg Cantelmo
(74) *Attorney, Agent, or Firm* — Dickstein Shapiro LLP

(57) ABSTRACT

A large, scalable SOFC system based on modules, which may be connected in series on the cathode gas side. The fuel cell stacks are aligned side by side and assembled into a stack module with cathode inlets on one face of the module and the cathode outlets on the other face of the module. The stack modules are serially connected in a simple manner by placing the stack modules one after the other, so that the outlet face of the first module faces the inlet face of the second module and so on. In the chamber between two stack modules, the air is cooled for example by addition of cold quench air or by a heat exchanger. This offers compactness, simple stack/system interface and improved system performance. The modules are designed for manufacturability, well-balanced heat management and high fuel utilization.

3 Claims, 2 Drawing Sheets

SERIAL CONNECTED FUEL CELL STACK MODULE ASSEMBLY

BACKGROUND OF THE INVENTION

1. Field of the Invention

The invention relates to a modular connection of fuel cell stacks, more specifically to stack modules with a serial connection of the cathode gas inlets and outlets, more specifically to stack modules each having one inlet and one outlet common cathode gas side manifold for all the fuel cells in a module, in particular for Solid Oxide Fuel Cell (SOFC) stacks.

2. Description of the Related Art

The electro-chemical reactions and the function of a fuel cell is not the essence of the present invention, thus this is not explained in greater detail here, but considered known to a person skilled in the art.

To increase the voltage produced by the SOFC, several cell units are assembled to form a stack and are linked together by interconnects. These layers of the stack are sealed together by means of a gas tight and temperature resistant seal, such as glass, along some or all edges. There is a feasible limit to the size of stacks, to the area of each cell as well as to the number of cells which are assembled. The failure risk of a fuel cell stack increases with the number of cells and the size of the area. To increase the effect produced by SOFC it is therefore known to connect several stacks instead of simply increasing the cell area and number of cells in a single stack. The stacks can be connected in series and in parallel both on the electrical side and on the anode gas and cathode gas side of the stacks.

US 2006/0172176 A1 and U.S. Pat. No. 6,033,794 disclose examples of serially connected fuel cell stacks, but not how to realize the connection. U.S. Pat. No. 6,403,247 describes fuel cell stacks sharing a common gas input chamber, but a not serial connection where a common chamber connects the outlet of one stack or stack assembly to the inlet of another.

In spite of the presented known solutions to the connection problem of several fuel cell stacks, all of them have some of the inherent problems:

Though several stacks are connected in single modules, still the cathode gas manifolding has not been equally simplified.

When several stacks or several modules are connected in series, an extensive channelling/piping is necessary to connect to cathode and anode gas.

Connecting several stacks to increase effect also increases the supply system demand (heat exchangers for cooling and pre-heating).

Relative high temperature fuel cells, such as Solid Oxide Fuel Cell stacks has relative long start-up and shut-down periods.

SOFC assemblies of several stacks with relative large effect output, have a low flexibility towards varying the effect output.

SUMMARY OF THE INVENTION

It is an object of the present invention to solve the mentioned problems by providing a new SOFC stack assembly for at least two or more fuel cell stacks.

More specifically, it is an object of the invention to provide a SOFC stack assembly comprising serially connected stack modules, each module comprising at least one stack, with a simplified connection of the modules in the series omitting the necessity of an extensive extra channelling and piping.

An object of the invention is also to provide a SOFC stack assembly which reduces the necessity of heat exchangers for cooling and heating.

It is an important further object of the invention to provide a SOFC stack assembly with an increased effect flexibility allowing it to quickly increase or decrease the power output without necessitating long start-up or shut-down procedures.

A further object of the invention is to provide a SOFC stack assembly with a simplified cathode gas side manifolding system common to all stacks in a stack module.

A further object of the invention is to provide a SOFC stack assembly, which is compact relative to the effect output and which is relatively insensitive to variations in the pressure loss over the stacks in the assembly.

A further object of the invention is to provide a SOFC stack assembly which inherently allows simple connections for a surplus injection of process gases or fluids.

These and other objects are achieved by the invention as described below.

The invention is a particularly simple way of connecting fuel cell stacks in series on the cathode gas side.

The fuel cell stacks are made with air side manifolds, i.e. the cathode inlet and outlet to each individual cell in the stacks are open to the sides of the stacks. A number of stacks are aligned side by side and assembled into a stack module with cathode inlets on one face of the module and the cathode outlets on the other face of the module. The stack modules are serially connected in a simple manner by placing the stack modules one after the other, so that the outlet face of the first module faces the inlet face of the second module and so on. In the chamber between two stack modules, the air is cooled for example by addition of cold quench air or by a heat exchanger.

In addition, the invention offers a convenient way of operating the fuel cell system at fractions of the full load. When the SOFC stack assembly runs at full load, all stack modules in the assembly are provided with cathode gas via the common cathode gas side manifolds and with anode gas via anode gas inlets to each module. But when a partial load is required, only the necessary stack modules are provided with anode gas in a sufficient volume to provide considerable, electrical effect production of those stacks.

For those stacks which are not necessary in the partial load mode, the anode gas supply is either shut completely off or turned down to a minimum flow sufficient to protect the stand-by stack(s) against degradation. The resulting great advantage is that since both effect producing and stand-by stacks are provided with hot cathode gas, the stand-by stacks are always heated to the desired operation temperature. Thus they are ready to quickly shift from stand-by mode to operation mode when anode gas is again supplied to the stack(s). This provides for a so far unseen flexibility of effect output from a SOFC stack assembly.

The invention provides a range of advantages of which some are listed below:

1. A very simple mechanical structure: fewer tubes and a highly compact structure. For example, four stack modules with four stacks in each gives a 16-stack unit with one cathode inlet string, one cathode outlet string, one fuel inlet string and one fuel outlet string. In addition, three cold strings for quench cooling are required.

2. The arrangement of the stack modules allows a part-load operation without causing the problem of the stacks becoming too cold for an efficient operation.

3. When numerous stacks are connected in parallel with the gas supplies, then the pressure loss of the individual stacks must be closely matched in order to run all stacks at suitable operating points. The latter requires an extensive quality control and makes the production of such stacks expensive. A significantly increased tolerance towards differences in pressure losses is achieved by assembling a small number of stacks in a stack module and by connecting them in series on the cathode side.

4. Balance-of-plant components, like the high-temperature heat exchanger for cathode air preheating, can be integrated at the ends of the duct formed by the serially connected stacks, further adding to a compact and cost-effective mechanical structure.

The invention relates to the features described in greater detail below.

1. A Solid Oxide Fuel Cell stack assembly comprising a plurality of fuel cells arranged in at least two cathode gas serially connected stack modules and comprising at least one stack in each module, where cathode gas exhaust from a first primary stack module is carried to the cathode gas inlet of the next at least one secondary serially connected stack module, wherein each stack module has a first cathode gas inlet side manifold common to all the stacks of said module and a second cathode gas outlet side manifold common to all the stacks of said module, and wherein the cathode gas is serially connected from the first primary stack module to the next at least one secondary stack module of the serial connection through said common side manifolds.

2. A Solid Oxide Fuel Cell stack assembly according to feature 1, wherein the outlet side manifold of said first primary stack module is connected directly or through an intermediate channel to the inlet side manifold of the next at least one secondary stack module in the serial connection.

3. A Solid Oxide Fuel Cell stack assembly according to feature 1 or 2, wherein the connection between two serially connected stacks comprises a cooling media inlet or a heat exchanger.

4. A Solid Oxide Fuel Cell stack assembly according to feature 3, wherein the cooling media is air.

5. A Solid Oxide Fuel Cell stack assembly according to any of the preceding claims, wherein the assembly comprises two serially connected stack modules, a first primary stack module and a secondary stack module.

6. A Solid Oxide Fuel Cell stack assembly according to any of the preceding claims, wherein the assembly comprises four serially connected stack modules, a first primary stack module and three secondary stack modules.

7. A Solid Oxide Fuel Cell stack assembly according to any of the preceding claims, wherein each stack module comprises four stacks arranged in a square, two stacks high and two stacks wide.

8. A process of running a Solid Oxide Fuel Cell stack assembly according to any of the claims 1 to 7 comprising the steps of
  providing at least two cathode gas serially connected stack modules, one primary stack module and at least one secondary stack module
  providing at least the first stack module in the series with anode gas
  providing the cathode gas inlet of the first primary stack module in the series with preheated cathode gas
  providing the cathode gas inlet of the at least one secondary stack module in the series with hot exhaust cathode gas from the cathode gas outlet of the preceding stack module.

9. A process according to claim 7 suited for a partial load running of the assembly, wherein anode gas is carried to the primary stack, said anode gas being carried to none or only to some of the secondary stack modules in the assembly, and wherein only the exhaust cathode gas provided to the cathode gas inlet of the secondary stack module provided with anode gas is cooled by means of a heat exchanger or by inlet of additional cold cathode gas.

10. A process according to any of the preceding claims, wherein the assembly comprises two stack modules.

11. A process according to any of the preceding claims, wherein the assembly comprises four stack modules.

12. A process according to claim 9 suited to run at approximately 25%, 50%, 75% or 100% load, viz.
  when running at 25% load only the first stack module in the series is provided with anode gas,
  when running at 50% load only the first and the second stack module in the series are provided with anode gas and only the cathode gas provided to the second stack module is cooled,
  when running at 75% load only the first, the second and the third stack module in the series are provided with anode gas and only the cathode gas provided to the second and third stack module is cooled,
  when running at 100% load all the stack modules in the series are provided with anode gas and the cathode gas provided to the second, third and fourth stack module is cooled.

BRIEF DESCRIPTION OF THE DRAWINGS

The invention is further illustrated below by means of the accompanying drawings showing examples of embodiments of the invention.

DETAILED DESCRIPTION OF THE PREFERRED EMBODIMENTS

Position number overview:
101: Fuel cell stacks of the first primary stack module.
102: Fuel cell stacks of the second secondary stack module.
103: Fuel cell stacks of the third secondary stack module.
111, 211: First primary fuel cell stack module.
112, 212: Second secondary fuel cell stack module.
113, 213: Third secondary fuel cell stack module.
214: Fourth secondary fuel cell stack module.
121, 221: First intermediate channel.
122, 222: Second intermediate channel.
223: Third intermediate channel.
131, 231: First common cathode gas inlet side manifold (of the first stack module).
132, 232: Second common cathode gas outlet side manifold (of the third/fourth stack module).
181, 281: Inlet cathode gas for the first, primary stack module.
182, 282: Cathode gas stream from the first, primary stack module to the second, secondary stack module.
183, 283: Cathode gas stream from the second, secondary stack module to the third, secondary stack module.
284: Cathode gas stream from the third, secondary stack module to the fourth, secondary stack module.
191, 291: Additional cold cathode gas inlet between first and second stack module.
192, 292: Additional cold cathode gas inlet between second and third stack module.
293: Additional cold cathode gas inlet between third and fourth stack module.

Figure 1:
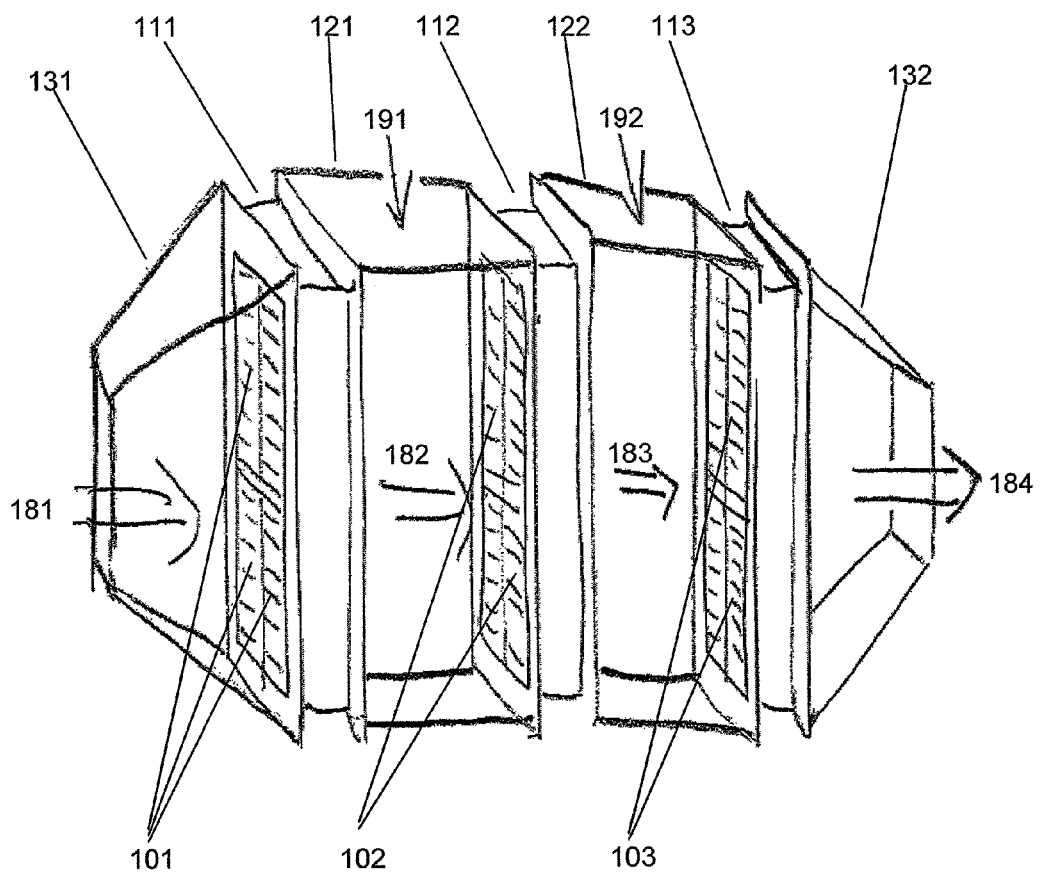
FIG. 1 shows a schematic view of three cathode gas serially connected fuel cell stack modules according to an embodiment of the invention.

271, 272, 273, 274: anode gas for the first, second, third and fourth stack module FIG. 1 shows one embodiment of a SOFC fuel cell stack assembly comprising three stack modules 111, 112, 113 in cathode gas serial connection. Each stack module comprises four separate SOFC stacks 101, 102, 103 with a cathode gas side manifolding. The four modules are assembled in a square, viz. two stacks high and two stacks wide. A sealant is provided between the stacks in a module and between each stack and the module cassette surrounding the modules, said sealant providing a substantially gas tight connection. One single side manifold 131 common to all four stacks of the first primary module 111 allows a cathode gas supply 181, i.e. one common gas supply to all four stacks in the primary module. By primary is here meant the first module in the series which receives "fresh" cathode gas that has been preheated, but not previously run through a stack module.

All the fuel cells are provided with anode gas inlets through a separate anode gas supply for each stack module (not shown). The following two secondary modules 112, 113 are cathode gas serial connected to the first primary module either directly by connecting the cathode gas outlet side manifold of one stack module to the cathode gas inlet side manifold of the next stack module in the series or as shown in FIG. 1 by connecting the cathode gas outlet side manifold of one stack module via an intermediate channel 121, 122 to the cathode gas inlet side manifold of the next stack module in the series. By secondary modules is here meant stack modules receiving cathode gas which has at least partially been run through a preceding stack module in the series. In either case, an additional relative cold cathode gas inlet 191, 192 is provided between the serially connected stack modules. This additional supply of cold cathode gas serves to ensure the correct operating temperature of the cathode gas supplied to each of the secondary stack modules. Thus, only the primary stack module requires a supplementary cathode gas pre-heater (not shown).

When operating at part load, the anode gas supply for the first 112 or the second 113 or both the secondary stack modules 112, 113 has been minimized or totally shut off. To ensure the correct stand-by temperature of the stand-by stacks, also the relevant additional supply of cold cathode air is regulated or shut off.

At the end of the assembly, cf. the drawing, a common cathode gas outlet side manifold is provided. In the illustrated embodiment this manifold is common to all four stack in the last secondary module 113 of the series.

Figure 2:
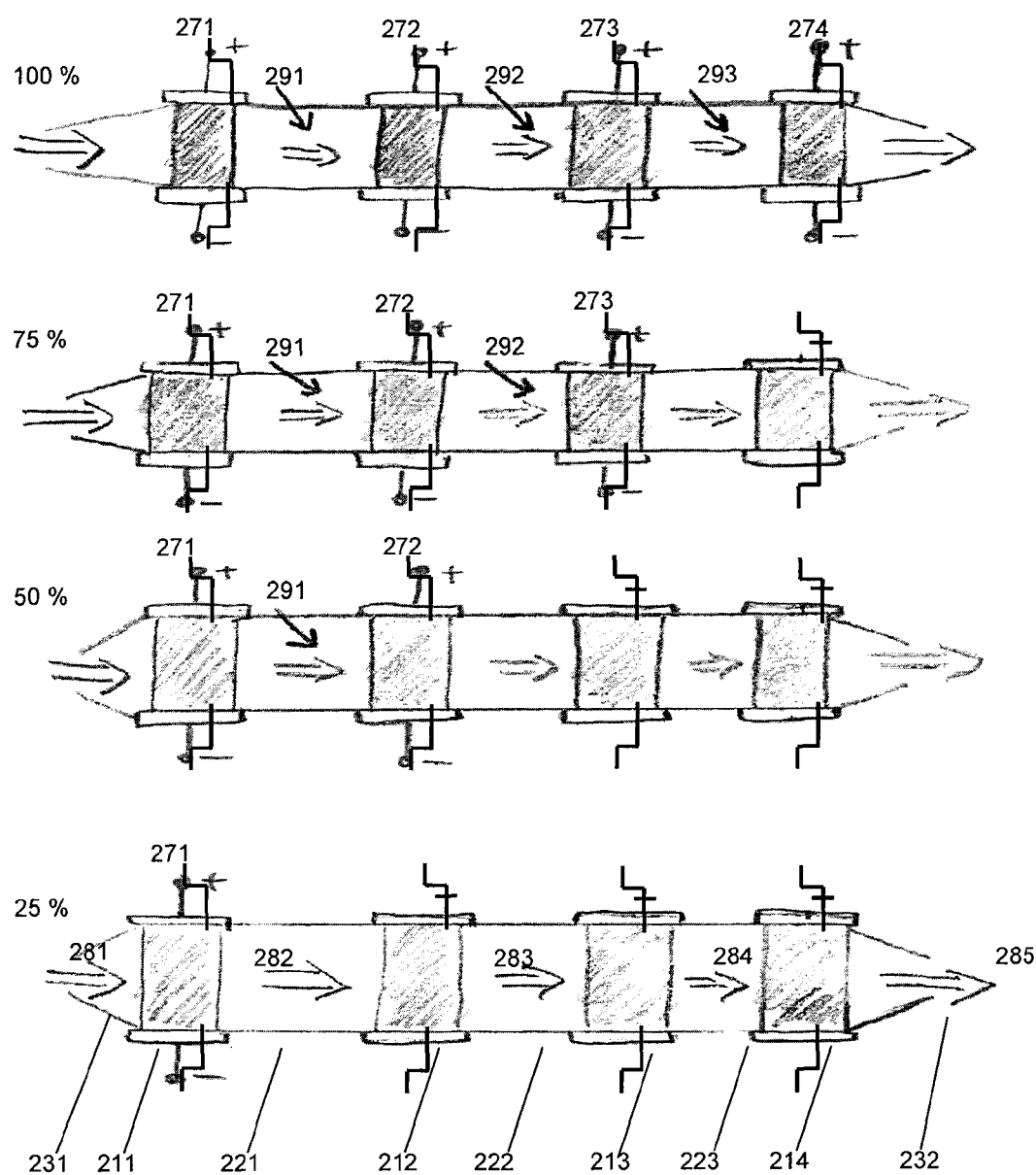
FIG. 2 shows a schematic view of four cathode gas serially connected fuel cell stack modules and in four different load situations according to an embodiment of the invention.

FIG. 2 shows a cathode gas serially connected SOFC stack module assembly comprising four modules 211, 212, 213, 214, one primary module 211 receiving "fresh" cathode gas and three secondary modules 212, 213, 214 each receiving partially used cathode gas from the preceding stack module in the series.

The set-up of FIG. 2 is analogous with the described set-up of FIG. 1. Four load situations are shown, viz. 25%, 50%, 75% and 100% load. As can be seen, in the 25% load situation all the stack modules only receive cathode gas 281 from the first common cathode gas inlet side manifold, and only the primary stack module receives operation anode gas (271). The secondary modules receive hot, partially used cathode gas 282, 283, 284 which ensures the correct stand-by temperature of the three stand by stack modules 212, 213, 214.

In the 50%, 75% and 100% load situations, more stack modules receive operation anode gas (272, 273 and 274), and accordingly those stack modules in operation receive an additional amount of cold cathode gas 291, 292, 293.

Since the stand-by stacks are kept warm by the cathode outlet of the up-stream stacks still in operation, the heat losses from a stack in operation are hence the same in all four load configurations. Accordingly, the part-load operation takes place with the same efficiency as the full load. Stand-by stacks require anode protection either in the form of an electric potential or in the form of safety gas or anode off-gas from the stacks still in operation.

| Example system calculation $P = 50$ kW, $U_f = 70\%$, $18 \times 18$ cm$^2$ counter-flow stacks ||||||||
|---|---|---|---|---|---|---|---|
| Config | Fuel | Elec. Eff. | Power Density | Excess air ratio | ΔT | Air in/out HeX | $P_{inlet}$ (mbarg) | $X_{O2}$ Outlet |
| Parallel | Methane | Base | Base | Base | Base | Base | 150 | 0.17 |
| Cascaded, 4 layers | Methane | 100% | 106% | 61% | 42% | 57% | 350 | 0.14 |

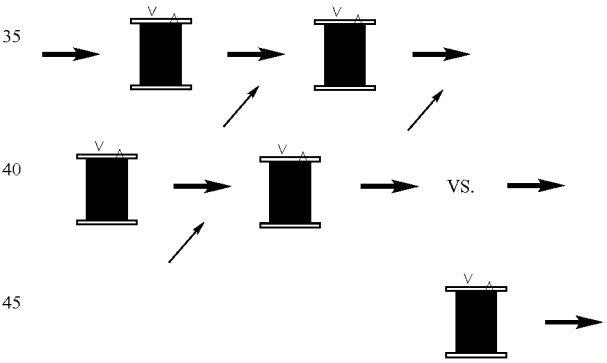

| | Methane | Methane | Methane |
|---|---|---|---|
| | Base Case | Quench Air | Intercooler |
| Serial Cell Groups | 1 | 4 | 4 |
| Net Efficiency | 49.9 | 49.9 | 49.9 |
| Total Number of Cells | 1264 | 1196 | 1200 |
| | Coal Syngas | Coal Syngas | Coal Syngas |
| Serial Cell Groups | 1 | 4 | 4 |
| Net Efficiency | 45.4 | 45.2 | 45.5 |
| Total Number of Cells | 1266 | 1216 | 1204 |

$P = 50$ kW

What is claimed is:

1. A process of running a Solid Oxide Fuel Cell stack assembly, said assembly comprising a plurality of fuel cells arranged in a plurality of cathode gas serially connected stack modules comprising at least one stack in each module, where cathode gas exhaust from a first primary stack module is carried to the cathode gas inlet of the next serially connected stack module, wherein the stack modules have a first cathode gas inlet side manifold common to all of the stack modules and a second cathode gas outlet side manifold common to all of the stack modules, and wherein the cathode gas is serially connected from the first stack module to the next stack module of the serial connection through a common side manifold, and wherein the outlet side of said first primary stack module is connected directly to the inlet side of the next stack module in the serial connection, and wherein the connection between two serially connected stacks further comprises a cooling media inlet or a heat exchanger, the process comprising the steps of:

providing the plurality of cathode gas serially connected stack modules comprising one primary stack module and secondary stack modules;

supplying anode gas to the first primary stack module but to none or to only some of the secondary stack modules of the assembly, through a separate anode gas inlet corresponding to each of the primary stack module and only some of the secondary stack modules to allow at least some of the secondary stack modules to be in a part load or stand-by mode or operation while cathode gas is kept flowing through said primary stack modules and through all secondary stack modules, to provide a partial load running of the assembly and to allow the secondary stack modules that are in part load or stand-by mode or operation to be heated to a desired operation temperature, so that to allow the secondary stack modules that are in part load or stand-by mode or operation to be ready to shift from the part load or stand-by mode or operation to operation mode;

providing the cathode gas inlet of the first primary stack module in the series with preheated cathode gas; and providing the cathode gas inlet of the secondary stack modules in the series with exhaust cathode gas from the cathode gas outlet of the preceding stack module, wherein anode gas is led to the first primary stack module and said anode gas is carried to at least one of the secondary stack modules in the assembly.

2. A process according to claim 1, wherein the assembly comprises two stack modules.

3. A process according to claim 1, wherein the assembly comprises four stack modules.

\* \* \* \* \*